United States Patent
Watson

(10) Patent No.: US 10,136,593 B2
(45) Date of Patent: Nov. 27, 2018

(54) HYDROPONIC ROOF GUTTER SYSTEM

(71) Applicant: Christopher Kyle Watson, Tampa, FL (US)

(72) Inventor: Christopher Kyle Watson, Tampa, FL (US)

(*) Notice: Subject to any disclaimer, the term of this patent is extended or adjusted under 35 U.S.C. 154(b) by 85 days.

(21) Appl. No.: 15/180,053

(22) Filed: Jun. 12, 2016

(65) Prior Publication Data

US 2017/0354103 A1     Dec. 14, 2017

(51) Int. Cl.
*A01G 31/02* (2006.01)
*E04D 13/064* (2006.01)

(52) U.S. Cl.
CPC .......... *A01G 31/02* (2013.01); *E04D 13/064* (2013.01)

(58) Field of Classification Search
CPC ........ A01G 31/02; A01G 27/02; A01G 31/06; E04D 13/064; E04D 13/0645; A31G 31/04
USPC .............. 47/59 R, 41.01, 60, 62 C, 62 R, 86
See application file for complete search history.

(56) References Cited

U.S. PATENT DOCUMENTS

| | | | | |
|---|---|---|---|---|
| D247,357 S | * | 2/1978 | Gray | 47/59 R |
| 4,976,064 A | * | 12/1990 | Julien | A01G 31/02 239/545 |
| 6,807,770 B2 | * | 10/2004 | Wainwright | A01G 31/02 239/214 |
| 6,951,076 B2 | * | 10/2005 | Winsbury | A01G 31/02 47/59 R |

* cited by examiner

*Primary Examiner* — William V Gilbert

(57) ABSTRACT

The present invention is an apparatus that is utilized as a hydroponic growth conduit located around the perimeter of a building roof, where the plant media growth extends over the roof providing shade and a form of insulation for the building. The system serves as a form of green roofing that does not require a soil medium to grow the plants and therefore does not require the related additional structural components or costs. Existing roofs can easily be modified to accommodate this proposed apparatus. Said apparatus retains a designed volume of water to provide a growth medium for the plant's root systems. The apparatus continues to function similarly to a traditional roof gutter, collecting, conveying and discharging accumulated rain water.

3 Claims, 2 Drawing Sheets

HYDROPONIC ROOF GUTTER SYSTEM

BACKGROUND OF THE INVENTION

This invention is a form of green roofing. Green roofing is a method of construction of roofing via materials and design that allows for more efficient building and lower utility costs. Traditional green roofing methods involve a soil medium to allow for growth of plant material, which in turn provides insulation. The soil adds weight, which requires additional structural support. The structural requirements for traditional green roofing incur additional cost and are prohibitive to application on existing buildings.

Hydroponic principals are utilized for the invention. Hydroponics is a method of growing plant matter without the use of soils. Plants are usually applied in a container with the root system suspended in a water medium.

The invention involves a combination of these two technologies, along with a modification of existing roof gutter designs, to provide a form of green roofing that can be constructed on buildings in a manner that has yet to be applied.

BRIEF SUMMARY OF THE INVENTION

This is a modified gutter system that incorporates traditional hydroponic principles allowing growth of an organic medium onto the building roof, thus providing shade and a layer of insulation for the building.

The building's proposed gutter system, generally located around the perimeter of the roof, is designed with the downspout entrance elevated so to retain water and a top lid or cover with port holes to allowing installation of plant modules and the accompanying plants. This allows the plant material to grow utilizing traditional hydroponic methods. This method of green roofing requires little additional structural requirements for the building, and can be retro-fitted onto existing roofs.

BRIEF DESCRIPTION OF DRAWINGS

The present invention will now be described by way of example only, with reference to accompanying drawings in which.

DETAILED DESCRIPTION OF THE INVENTION

Figure 1:
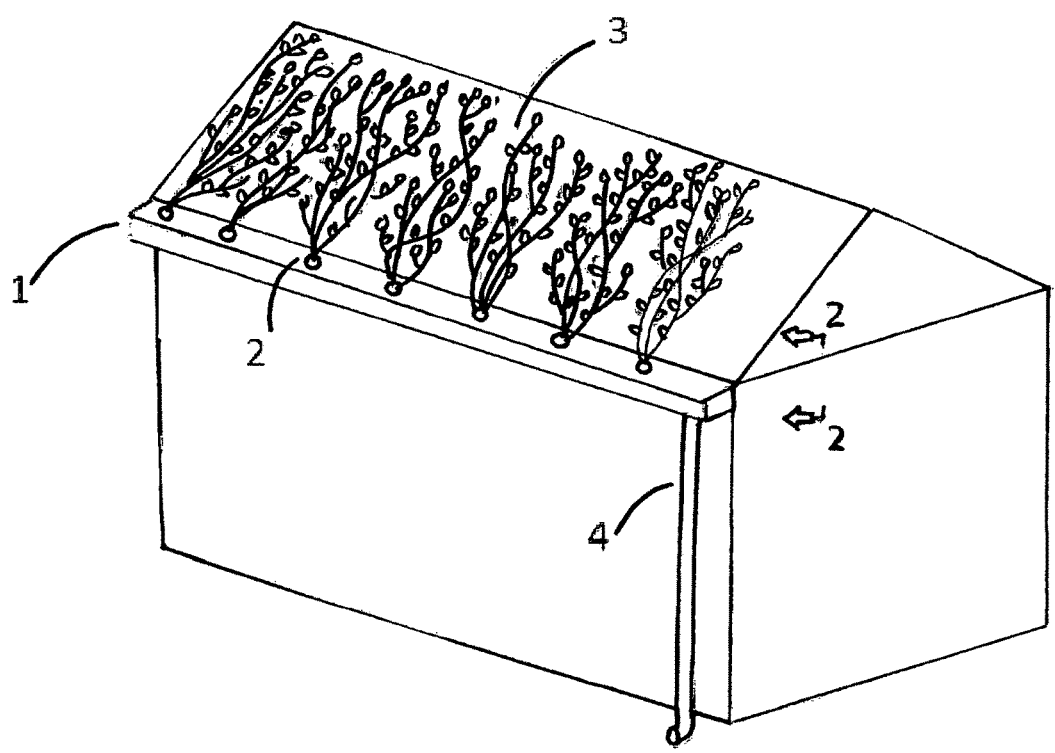
FIG. 1 is an isometric view of the present invention
Figure 2:
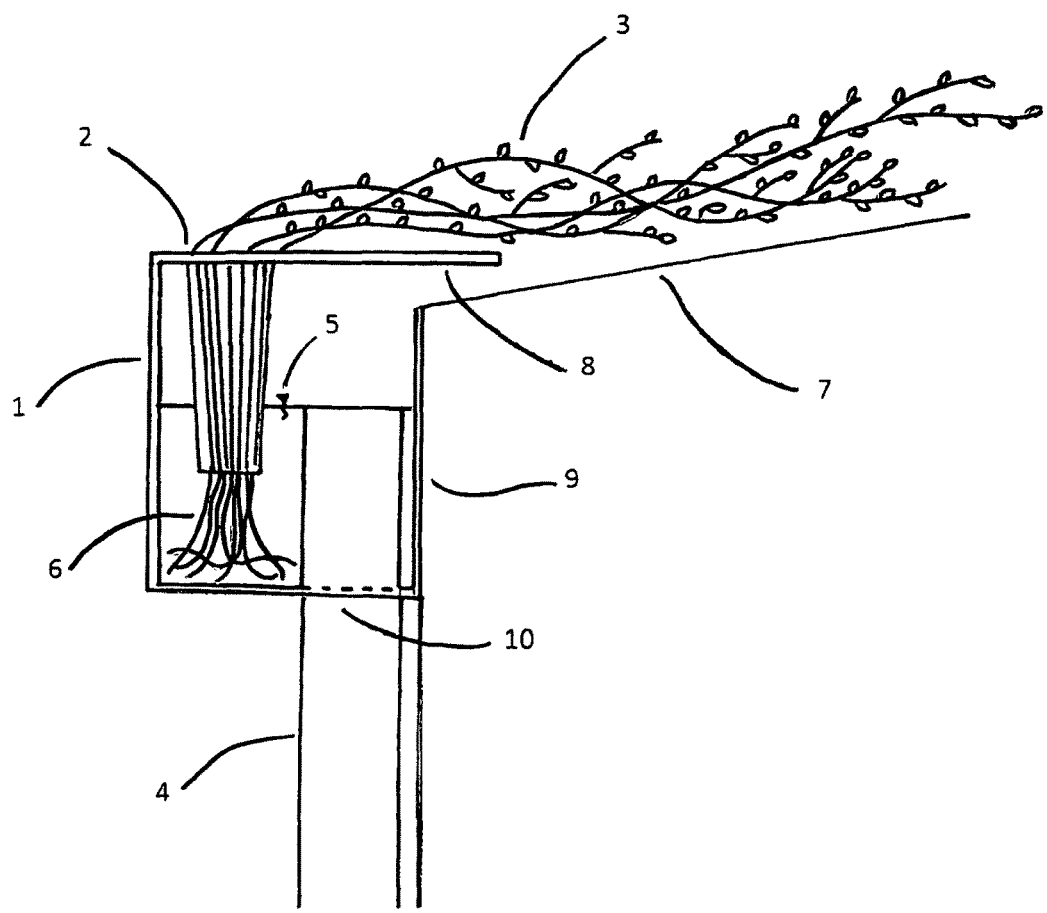
FIG. 2 is a cross sectional view of the present invention taken at the location and orientation noted in FIG. 1

The apparatus is composed of traditional roof drainage equipment, including a long narrow channel with a rectangular or semi-circular cross section composed of metal or plastic serving as a housing (1), along with some additional parts and modifications to allow for growth of the plant media hydroponically. The apparatus would require a lid with plurality of holes and housing units (2) to accommodate the plant media and inhibit sunlight from reaching the root system (6). The lid serves as a cantilever, terminating at the free distal end (8), leaving an opening, which allows for sheet flow conveyance of rainwater from the roof of the subject building (7) into the apparatus housing (1) for containment and eventual discharge. The apparatus will contain a downspout (4) for conveyance of excess water accumulated during a rainfall event. Said downspout (4) penetrates the apparatus housing (10) extending to a pre-determined elevation allowing for retention of a specific volume of water, denoted in FIG. 2 as the static water line (5). The water retained in the apparatus serves as the growth medium for the plant roots (6). The gutter system still operates in its intended manner, capturing and directing rainwater to downspouts that discharge the water to the ground or off-site. Discharge would only occur when the rainfall directed to the gutters exceeded the designed retention volume. Additional structural requirements would be required to account for the weight added by the water retained in the apparatus.

The apparatus effectively serves as a hydroponics growth system. Thus, the apparatus would require all the appurtenances that accompany such systems to enable the growth of the plant media. This may include but is not limited to, water pumps, submerged air diffusers, supplemental water supply, supplemental nutrient supply and submerged water heaters. A form of trellis or lattice may be required to be installed parallel to the roof to encourage growth directionally.

The system is intended to grow plant media (3) over the roof, thus absorbing the radiation from the sunlight and providing an additional form of insulation, in turn helping to cool the interior and reduce utility costs. The system is most effective when implemented in warm climates.

I claim:

1. An apparatus for drainage and hydroponic growth, comprising; a conduit, said conduit being placed around at least a portion of a perimeter of a roof of a structure, said conduit having a rectangular or semi-circular cross section and is made from metal or plastic, said conduit having a first edge and an opposed second edge and a top connected to said first edge and extending in a direction of said second edge and terminating in a free distal end; a plurality of holes in said top lid, each respective one of said holes having a plant supporting module configured to receive a plant therein; said conduit further having a discharge outlet pipe extending through a bottom of said conduit and having an end terminating within said conduit, said conduit configured to retain a pre-determined volume of water; said conduit further comprising a water pump, a supplemental nutrient supply and a water heater therein, said water heater configured to be submerged in said pre-determined volume of water.

2. The apparatus of claim 1, wherein said conduit is a gutter.

3. The apparatus of claim 1, wherein said conduit is configured to retain accumulated rainfall and said discharge outlet pipe is configured to discharge an amount of said rainfall when a level of said rainfall exceeds said end of said discharge outlet pipe.

* * * * *